United States Patent [19]
Chatterjee et al.

[11] Patent Number: 5,795,362
[45] Date of Patent: Aug. 18, 1998

[54] ALUMINA CERAMIC ARTICLES HAVING CUBIC SPINEL ON SURFACES AND METHODS FOR PREPARING ALUMINA CERAMIC ARTICLES AND FOR SINTERING

[75] Inventors: Dilip K. Chatterjee; Syamal K. Ghosh; Thomas N. Blanton, all of Rochester, N.Y.

[73] Assignee: Eastman Kodak Company, Rochester, N.Y.

[21] Appl. No.: 670,058

[22] Filed: Jun. 25, 1996

Related U.S. Application Data

[63] Continuation of Ser. No. 398,331, Mar. 3, 1995, abandoned.

[51] Int. Cl.[6] .................................................... C03B 19/01
[52] U.S. Cl. .............................. 65/17.3; 501/103; 501/104; 501/105
[58] Field of Search .......................... 65/17.3; 501/103, 501/104, 105; 264/56, 60, 624

[56] References Cited

U.S. PATENT DOCUMENTS

| | | | |
|---|---|---|---|
| 4,221,650 | 9/1980 | Friese et al. | |
| 4,298,385 | 11/1981 | Claussen et al. | 501/105 |
| 4,314,827 | 2/1982 | Leitheiser et al. | 501/12 |
| 4,316,964 | 2/1982 | Lange | 501/105 |
| 4,587,225 | 5/1986 | Tsukuma et al. | 501/105 |
| 4,666,467 | 5/1987 | Matsumoto et al. | 501/105 |
| 4,900,492 | 2/1990 | Claussen et al. | 501/105 |
| 5,183,610 | 2/1993 | Brog et al. | 501/105 |
| 5,246,893 | 9/1993 | Takagi et al. | 501/87 |
| 5,290,332 | 3/1994 | Chatterjee et al. | 65/18.1 |
| 5,358,913 | 10/1994 | Chatterjee et al. | 501/103 |
| 5,411,690 | 5/1995 | Ghosh et al. | 264/63 |

*Primary Examiner*—Jill Warden
*Attorney, Agent, or Firm*—Arthur H. Rosenstein

[57] ABSTRACT

An alumina ceramic article and a method for preparing the article. The method comprises the steps of:

(1) Compacting a mixture of a first concentration of particulate aluminum oxide sufficient to prevent retention of the zirconium oxide alloy particles in the surface in a predominantly tetragonal crystal structure and a second concentration of particulate zirconium oxide alloy. The zirconium oxide alloy is zirconium oxide and a secondary oxide selected from the group consisting of MgO, CaO, $Y_2O_3$, $Sc_2O_3$, $CeO_2$, and rare earth oxides having a concentration of secondary oxide generally of about 0.5 to about 5 mole percent $Y_2O_3$, from about 0.1 to about 1 mole percent MgO, from about 0.5 to about 15 mole percent $CeO_2$, from about 0.5 to about 7.0 mole percent $Sc_2O_3$, or from about 0.5 to about 5 mole percent CaO, relative to the total of the zirconium oxide alloy. The compacting results in the formation of a blank.

(2) Providing contact between the blank and a dopant oxide.

(3) Sintering the blank in contact with the dopant oxide.

18 Claims, 3 Drawing Sheets

ALUMINA CERAMIC ARTICLES HAVING CUBIC SPINEL ON SURFACES AND METHODS FOR PREPARING ALUMINA CERAMIC ARTICLES AND FOR SINTERING

CROSS REFERENCE TO RELATED APPLICATIONS

This is a continuation of application Ser. No. 08/398,331, filed 03 Mar. 1995, now abandoned.

FIELD OF THE INVENTION

The present invention pertains to ceramic items and methods for preparing ceramic items and more particularly pertains to an alumina ceramic article having a core that is predominantly α-alumina and a case that is predominantly cubic spinel.

BACKGROUND OF THE INVENTION

In the production of materials such as photographic films and papers; cutting tools, such as perforators and slitter knives, require impact resistance to eliminate catastrophic failures and corrosion, and wear and abrasion resistance to improve service life and productivity. Conventional cutting tool materials, such as high speed steels, hardenable stainless steels, and cemented tungsten carbides, meet some of these requirements but have considerable limitations to warrant improved service life. Conventional cutting tool materials, such as high speed steels, hardenable stainless steels, and cemented tungsten carbides, meet some of these requirements but have the limitation of requiring frequent maintenance due to wear.

Ytrria-doped tetragonal zirconia polycrystal (Y-TZP) ceramic materials offer many advantages over conventional materials and are therefore used in cutting, perforating, slitting and chopping of photographic film and paper webs. Y-TZP is one of the toughest ceramics. The toughness is achieved at the expense of hardness and strength. Tetragonal zirconia alloy-alumina composite, that is, the product of sintering a particulate mixture of zirconia alloy and alumina, is another tough and relatively soft structural composite. Tetragonal zirconia alloy-alumina composite has tribological properties that are not as attractive as other high performance structural ceramics like SiC and $Si_3N_4$. An example of a material having good hardness and strength is monolithic cubic spinel, however, this material has unusually high brittleness and is unusable for structural applications.

It is known that impact bearing tools or parts have a longer service life and better performance if made with a core of a tough material and a surface or case of a hard material. Common examples include nitrided or case carburized metal tool parts, camshafts and the like. A surface treatment such as carburizing or nitriding is used to form a stable hard phase over a tougher core. The phase changes are dependent upon the reactivity of the parent metallic material with a reacting material, for example, a carbon or nitrogen species. In ceramics, inherent chemical inertness has impeded the preparation of comparable composite structures. Ceramic articles having surface areas with stress induced phase changes are very easy to achieve, since such phase changes occur as a result of abrasion on working surfaces during use. With Y-TZP, stress induces transformation from a tough, but not very hard tetragonal phase to a harder monoclinic phase. This phase change can be utilized in different ways. Net shape tetragonal zirconia alloy articles can be produced as disclosed in U.S. Pat. No. 5,290,332. The term "net shape" is defined as a ceramic article that is dimensionally true after sintering and therefore does not necessitate further machining prior to use in its intended working environment. During use, working surfaces of a net shape article will be subject to phase transformation. Suitable tolerances will permit abrasion losses at working surfaces, prior to phase transformation, to be ignored. Alternatively, phase transformation to monoclinic zirconia can be induced by an abrading process, such as grinding or lapping, during fabrication of the tool. Neither approach is straight-forward in that two variables, the dimensions of the article and its phase characteristics are changing simultaneously. Both approaches are extremely problematic when attempted with an article having a complex geometry.

An alternative approach is taught by U.S. Pat. No. 5,358,913; which is hereby incorporated herein by reference. In that approach, a tetragonal zirconia alloy article, which can be near net shape, is compacted and then sintered in the presence of an MgO, CaO, $Y_2O_3$, $Sc_2O_3$, $CeO_2$, or rare earth oxide dopants and their combinations thereof to produce an article having a tetragonal core and a cubic phase case. The dopant can be provided in a number of different forms such as a solid plate, a powder, or a layer produced by decomposition of an organo-metallic precursor film. In U.S. patent application Ser. No. 07/994,820 now abandoned in favor of Continuation-in-Part application Ser. No. 08/231,870, filed Apr. 25, 1994; a method is described for producing articles having a tetragonal zirconia alloy core and a monoclinic case. In U.S. patent application Ser. No. 07/994,818 now abandoned in favor of a Continuation-in-Part application Ser. No. 08/400,416, filed 03 Mar. 1995 concurrently with this application, which is hereby incorporated herein by reference; a method is described for producing articles having a tetragonal zirconia alloy and alumina core and a case of tetragonal zirconia and cubic spinel. In the core and the case the predominant species is tetragonal zirconia. The application also teaches a method for producing articles having a core that is tetragonal zirconia alloy along with less than about 5 weight percent alumina and having a case that is cubic phase zirconia and cubic spinel.

Alpha-phase alumina is harder than tetragonal zirconia. Spinel is harder than α-alumina and about as hard as cubic zirconia.

It would be desirable to provide a method for producing articles that provide a core that is predominantly alumina and a case that is predominantly cubic spinel.

SUMMARY OF THE INVENTION

In the broader aspects of the method for preparing ceramic articles of the invention, there is provided an alumina ceramic article and a method for preparing the article. The method has the steps of:

(1) Compacting a mixture of a first concentration of particulate aluminum oxide and a second concentration of particulate zirconium oxide alloy. The first concentration is greater than 50 weight percent of the total of the first and second concentrations. The first concentration is sufficient to prevent retention of the zirconium oxide alloy particles in the surface in a predominantly tetragonal crystal structure. The zirconium oxide alloy is zirconium oxide and a secondary oxide selected from the group consisting of MgO, CaO, $Y_2O_3$, $CeO_2$, $Sc_2O_3$, rare earth oxides and a mixture of secondary oxides. The zirconium oxide alloy has a concentration of secondary oxide of about 0.1 to about 20 mole percent depending on the species of oxides present relative to the total of the zirconium oxide alloy. The compacting results in the formation of a blank.

(2) Subsequent to formation of the blank, providing contact between the blank and a dopant oxide selected from MgO, ZnO, FeO, CoO, NiO, and MnO.

(3) Sintering the blank in contact with the dopant oxide. During the sintering the dopant oxide diffuses into the surface of the blank, converting the aluminum oxide particles in the surface into cubic spinel, the composite of which is $MgAl_2O_4$ if the dopant oxide is MgO and $ZnAl_2O_4$ if the dopant oxide is zinc oxide, etc. and converting the zirconium oxide alloy particles in the surface from a tetragonal crystal structure to cubic and monoclinic crystal structures.

The ceramic article has a core that is predominantly alumina and a case that is predominantly cubic spinel. The core is sintered particles of aluminum oxide or of aluminum oxide and zirconium oxide alloy in a tetragonal crystal structure. The surface or case is sintered particles of cubic spinel or cubic spinel and zirconium oxide alloy in non-tetragonal crystal structures.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying drawing wherein.

DESCRIPTION OF SPECIFIC EMBODIMENTS

In the methods of the invention, particulate aluminum oxide or a mixture of a major portion of particulate aluminum oxide and a minor portion of particulate zirconia alloy, is compacted and sintered. The sintering is performed in the presence of a dopant selected from: MgO, FeO, ZnO, NiO, and MnO, and combination thereof, as discussed below in detail. The resulting alumina ceramic article of the invention has a core of alumina or alumina and tetragonal zirconia alloy and a case of cubic spinel or cubic spinel along with cubic structure or cubic and monoclinic structure zirconia alloy.

The methods of the invention utilize particulate alumina and particulate alloys of $ZrO_2$ and additional "secondary oxide" selected from: MgO, CaO, $Y_2O_3$, $Sc_2O_3$ and $CeO_2$ and other rare earth oxides (also referred to herein as "Mg-Ca-Y-Sc-rare earth oxides"). Zirconia alloys useful in the methods of the invention have a metastable tetragonal crystal structure in the temperature and pressure ranges at which the ceramic article produced will be used. For example, at temperatures up to about 200° C. and pressures up to about 1000 MPa, zirconia alloys having about 0.1 to about 20 mole percent Mg-Ca-Y-Sc-rare earth oxide exhibit a tetragonal structure depending on the rare earth oxide used. Preferred oxides for alloying with zirconia are $Y_2O_3$, MgO, CaO, $CeO_2$, $Sc_2O_3$, rare earth oxides and combinations of these oxides. It is preferred that the zirconia powder have high purity, greater than about 99.9 percent. Specific examples of useful zirconia alloys include: tetragonal structure zirconia alloys having from about 0.5 to about 5 mole percent and preferably about 2 to about 5 mole percent $Y_2O_3$, or more preferably about 3 mole percent $Y_2O_3$. In the case of MgO, 0.1 to 1.0 mole percent provides tetragonal structure and for $CeO_2$, 0.5 to 15 mole percent provides tetragonal structure, calcium oxide of 0.5 to about 5 mole percent produces a tetragonal structure and $Sc_2O_3$ at about 0.5 mole percent to 7.0 mole percent produces a tetragonal structure. Examples of tetragonal structure zirconia alloys useful in the methods of the invention are disclosed in U.S. Pat. Nos. 5,290,332 and 5,411,690. Such zirconia alloys are described in those patents as being useful to provide a "net shape" ceramic article: a ceramic article that is dimensionally true after sintering and therefore does not necessitate further machining prior to use in its intended working environment.

Figure 1:
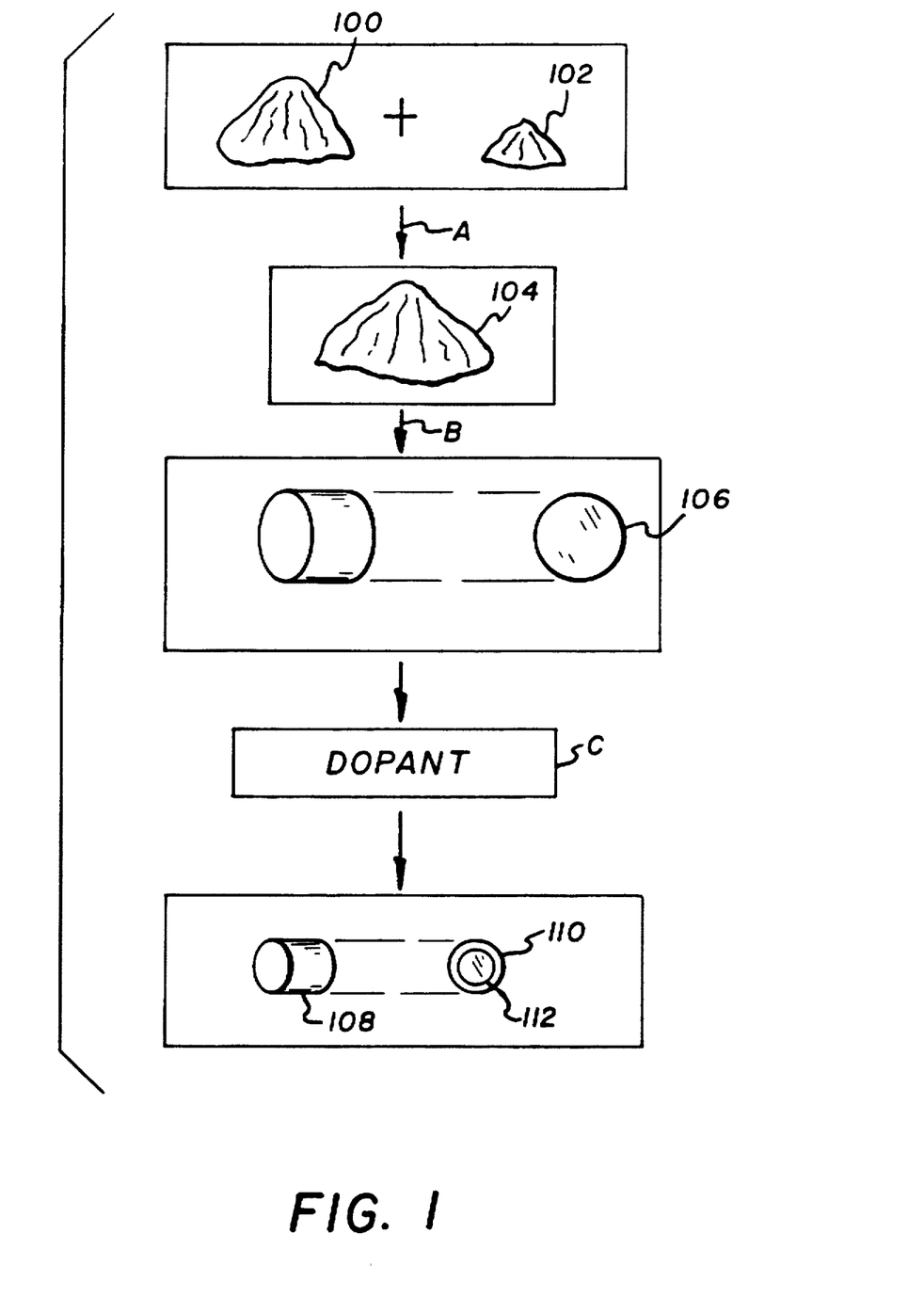
FIG. 1 is a schematic diagram of the method of the invention.

Step "A" in FIG. 1, diagrammatically illustrates the alloying process. Zirconia powder 100 is combined with one or more secondary oxide powders 102 to provide zirconia alloy powder 104. The preparation of zirconia alloys is well known to those skilled in the art and zirconia alloys are available commercially. For example, particulate zirconia alloy having 3 mole percent $Y_2O_3$ is marketed by Z-TECH Corporation, Bow, N.H., as "SYP-ULTRA 5.2 Yttria Stabilized Zirconia".

The grain and agglomeration sizes and distributions, moisture contents, and binders (if any) can be varied in both the alumina and the zirconia alloy, in a manner known to those skilled in the art. "Grain" is defined as an individual crystal, which may be within a particle, having a spatial orientation that is distinct from that of adjacent grains. "Agglomerate" is defined as an aggregation of individual particles, each of which may comprise multiple grains. In a particular embodiment of the invention, the grain and agglomeration sizes and distributions, and moisture contents of the alumina and the zirconia alloy are substantially the same and are selected as if the zirconia alloy was not going to be mixed with the alumina, that is in a manner known to the art to be suitable for the preparation of a zirconia alloy article.

An example of convenient particulate characteristics for a particular embodiment of the invention is the following. Purity is preferably well controlled at 99.9 to 99.99 percent, that is, impurities are no more than about 0.1 to 0.01 percent. The grain size is from about 0.1 micrometers to about 0.6 micrometers. The average grain size is 0.3 micrometers. The distribution of grain sizes is: 5–15 percent less than 0.1 micrometers, 40–60 percent less than 0.3 micrometers, and 85–95 percent less than 0.6 micrometers. The surface area of each individual grain ranges from about 10 to about 15 $m^2$/gram or is preferably 14 $m^2$/gram. Agglomerate size is from about 30 to about 60 micrometers and average agglomerate size is 40–60 micrometers. Moisture content is about 0.2 to 1.0 percent by volume of blank and is preferably 0.5 percent. The mixture of particulates is compacted in the presence of a binder such as gelatin or polyvinyl ionomer or more preferably polyvinyl alcohol. The binder is added to and mixed in with the particulate mixture, for example by spraying or ball milling prior to placement of the powder mixture in a compacting device.

Step "B" in FIG. 1, diagrammatically illustrates the mixing of the particulate zirconia alloy and the particulate aluminum oxide. The mixing can be mechanical or alternatively can be chemical, for example, mixing by coprecipitation. The particulate mixture formed is from about 75 to 100 percent by weight (weight/total weight of particulate mixture) $Al_2O_3$, and preferably is from about 80 to about 99 percent by weight $Al_2O_3$, or more preferably is from about 80 to about 95 percent by weight $Al_2O_3$.

The particulate mixture of zirconia alloy and alumina is compacted; heated to a temperature range at which sintering will occur; sintered, that is, maintained at that temperature range for a period of time; and then cooled. During all or part of sintering, the particulate mixture is in contact with dopant, as discussed below in detail. In FIG. 1, element 108 represents the product of both mixing and compaction, indicated by arrow "B". Compaction and sintering are generally discussed herein as two consecutive operations, as indicated by "B" and "C" in FIG. 1, however, the invention is not limited to a particular sequence of compacting and sintering. For example, compaction and sintering can be simultaneous in a single operation or partial compaction can be followed by sintering and further compaction. The interim product of compacting and sintering operations is referred to herein as a "blank", which is illustrated as element 108 in FIG. 1. Blank 108 is at least partially compacted and is either unsintered or not fully sintered.

Completion of compacting and sintering provides the finished alumina ceramic article 108, which has a core 112 substantially composed of alumina or alumina and tetragonal structure zirconia alloy and a case or surface 110 substantially composed of cubic spinel and zirconia alloy. The zirconia alloy in the case is cubic structure or a mixture of cubic and monoclinic structures. This contrasts with the results seen in the Comparative Examples (which are further discussed in Continuation-in-Part of U.S. patent application Ser. No. 07/994,818) in which the case is tetragonal zirconia with cubic spinel ($Al_2O_3$ from about 5 to about 50 wt. %) and cubic zirconia with cubic spinel ($Al_2O_3$ less than about 5 wt. %).

Prior to observing the results of the Examples and Comparative Examples, the inventors had thought that they would be able to provide an explanation for conversion methods having any relative percentages of zirconia alloy and alumina. The inventors had expected results to be in accord with the concepts that the formation of cubic spinel is highly favored thermodynamically over the conversion of tetragonal zirconia to cubic zirconia and that the mechanism of action follows alumina concentration.

What has been discovered by the inventors is that, surprisingly, if the concentration of alumina in the blank is from about 5 weight percent (relative to the total weight of zirconia and alumina) to about 50 weight percent, then the method of the invention produces an article having a case that is cubic spinel and tetragonal zirconia and a core that is alumina and tetragonal zirconia. During sintering, dopant, in effect, diffuses past tetragonal zirconia until all of the dopant has contacted and reacted, i.e. "partitioned", with alumina. In contrast, if the concentration of alumina in the blank is less than about 5 weight percent or greater than about 75 weight percent, then the method of the invention produces an article that has a case that is predominantly composed of cubic spinel and cubic zirconia or cubic and monoclinic zirconia and a core that is alumina and tetragonal zirconia. By predominantly it is meant that the amount of phases present is greater than or equal to 99.5%. During sintering, dopant does not, in effect, diffuse past tetragonal zirconia until all of the dopant has contacted and reacted with alumina; but rather reacts with alumina and tetragonal zirconia in the same vicinity, leaving alumina deeper within the blank unreacted.

These results are not compatible with a simple mechanism of action based on concentration alone. The results seen are compatible with a mechanism of action based upon an unpredictable alignment of several competing factors, such as rate of diffusion of dopant during sintering.

The particular method of compacting the powder is not critical. In a preferred embodiment of the invention, the alumina or particulate mixture is cold compacted to provide an unsintered blank, which is also referred to herein as a "green preform". The terms "cold compaction" and the like refer to compression of the particulate mixture at a temperature below glass transition or decomposition temperature of the binder. The green preform can be produced by such methods as cold uniaxial pressing, cold isostatic pressing, or cold extrusion. The particulate mixture is preferably subjected to uniform compacting forces in order to provide a blank 106 which has a uniform density.

Figure 2:
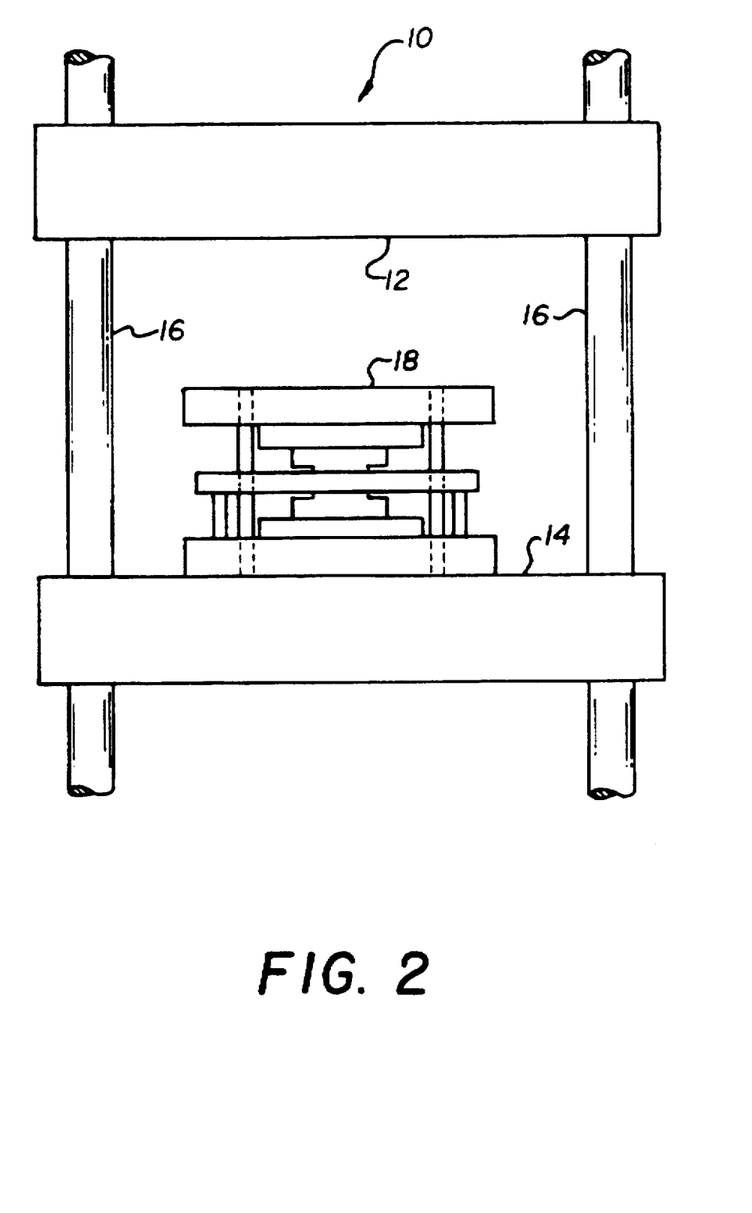
FIG. 2 is a fragmentary, cross-sectional view of a die press useful in the method of the invention.
Figures 3, 4:
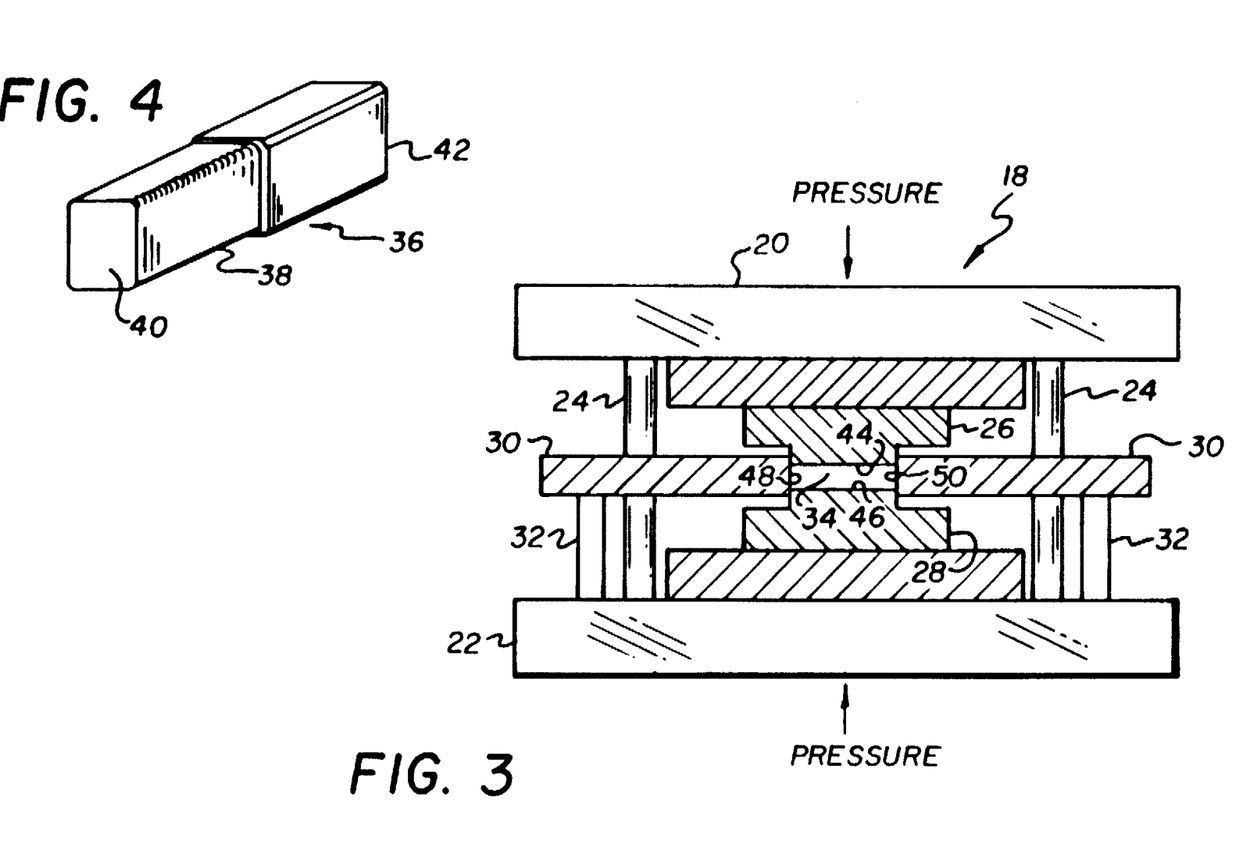
FIG. 3 is an enlarged cross-sectional view of the mold and die assembly of the die press of FIG. 2.
FIG. 4 is an enlarged schematic view of a ceramic perforator punch according to the invention.

A preferred compacting device that achieves uniform compacting forces is a floating mold die press 10, as disclosed in U.S. Pat. No. 5,290,332 and as shown in FIG. 2. Die press comprises fixed platform 12 and movable platform 14 mounted on supports 16. Movable platform 14 is driven by hydraulic means (not illustrated) and supports mold and die assembly 18. FIG. 3 further illustrates assembly 18 as comprising plates 20,22, which are slideably mounted on rods 24. Die sets 26,28 are mounted respectively on plates 20,22. Center platen 30 is mounted by spacer plates 32 on plate 22, and together with die sets 26,28 defines cavity 34 therebetween. The particulate mixture is compacted by first placing a selected volume in cavity 34. Platform 14 is then moved in the direction illustrated by the direction arrow in FIG. 2 so that plate 20 contacts platform 12 with a hydraulic pressure in the above described range, forcing plate 22 toward plate 20 and thereby compacting the powder to form the blank or green preform. The compaction forces exerted on the powder are substantially uniform because plates 20,22 are each free to move on rods 24, resulting in a blank having a uniform density.

Mold and die assembly 18 should have dimensionally close tolerances in order to minimize or eliminate the need for post-sintering machining of working surfaces of the finished ceramic article. For example, compaction surfaces 44,46 of respective die sets 26,28 can be parallel with a maximum design deviation from parallel of plus or minus 0.00005 inches. Compaction surfaces 48,50 of center platen 30 can be perpendicular to surfaces 44,46 and have a maximum design deviation from perpendicularity of plus or minus 0.00005 inches. The fill ratio should be established to produce a blank of a desired dimension, which after sintering will result in a ceramic of the final desired dimension. "Fill ratio" is the ratio of the height of cavity 34 taken along the axis of movement of platform 14 with platform 14 in its initial, lowermost position, to the height of the green part formed in cavity 34 taken along the axis of compaction of the powder in cavity 34. In other words, such height of the green preform also equals the distance between compaction surfaces 44,46 of mold and die assembly 18 at the final end-of-compacting position.

In a preferred method of the invention, the powder is cold compacted to provide a "green preform", which has a "green" density that is substantially less than the final sintered density of the ceramic article 108. The final sintered density of the case 110 differs slightly from the final sintered density of the core 112, however, except for very small articles 108, this difference can be ignored and final sintered density can be considered to equal the density of the core after sintering. It is preferred that the green density be between about 40 and about 65 percent of the core final sintered density, or more preferably be about 60 percent of the core final sintered density.

For a particular powder distribution, the green density is largely dependent upon the compaction pressure and the fill ratio. Preferred compaction pressures in the methods of the invention are about 10,000–30,000 psi (69–207 MPa). A more preferred compaction pressure is about 15,000 psi (about 100 MPa). The fill ratio is maintained at from about 2.5 to 1 to about 3.5 to 1. A preferred fill ratio is about 3.0 to 1. Compaction time can be readily determined by the operator depending upon the compaction pressure selected. Compaction time, for example, can be in the range of from about 60 seconds to about 10 seconds for compaction pressures in the range of about 12,000 psi to about 18,000 psi, respectively. For a compaction pressure of 15,000 psi (100 MPa), the compaction time can be 30 seconds. It is well known that the compaction pressure and time selected by the operator can be dependent upon the size of the finished part 108. Generally, as the part size increases, compaction time is increased.

Sintering provided in the methods of the invention is unlike previous alumina ceramic sintering procedures. It is ordinary practice in previous sintering procedures to place a blank upon a plate of $ZrO_2$ or $Al_2O_3$ during sintering. The ceramic parts produced by those procedures remain alumina or alumina and tetragonal structure zirconia alloy both on the surface and within the part. In the method of U.S. Pat. No. 5,290,332, zirconia alloy ceramic blanks are sintered in the presence of a "dopant" selected from: MgO, CaO, $Y_2O_3$, $Sc_2O_3$ and $CeO_2$ and other rare earth oxides. These materials represent "alloying agents", that is, oxides which can be combined with $ZrO_2$ to provide a zirconia alloy, in particular a zirconia alloy having a tetragonal crystal structure at room temperature and pressure. In the method of U.S. Pat. No. 5,290,332; the sintering step causes the zirconia alloy case of the article to change from tetragonal phase to cubic phase. In the method of Continuation-in-Part of U.S. patent application Ser. No. 07/994,818, as discussed above, sintering a blank containing alumina and tetragonal zirconia causes the case of the article to change to spinel and tetragonal zirconia or spinel and cubic zirconia, depending upon the alumina concentration. It is a novel and surprising feature of the methods of the invention that the case of the article produced is cubic spinel and cubic (or cubic and monoclinic) zirconia.

In the sintering of the methods of the invention, the dopant oxide selected from: MgO, FeO, ZnO, CoO, NiO, and MnO, and combination thereof, is in contact with the blank. It is preferred that the sintering result in a ceramic article (108) having a "full" or nearly theoretical density, and it is more preferred that the density of the ceramic article 108 be from about 99.5 to about 99.9 percent of theoretical density. Sintering is conducted in air or other oxygen containing atmosphere.

The methods of the invention are not limited to any particular sintering pressure and temperature conditions. Sintering can be performed at atmospheric pressure or alternatively a higher pressure can be used during all or part of the sintering to reduce porosity. The sintering is continued for a sufficient time period for the case of the article being sintered to reach a thermodynamic equilibrium structure. An example of a useful range of elevated sintering pressures is from about 69 MPa to about 207 MPa, or more preferably about 100–103 MPa. An example of a useful range of sintering temperatures is from about 1400° to about 1600° C., or more preferably about 1500° C. An example of a useful range of sintering times is from about 1 hour to about 3 hours or more preferably about 2 hours. In a particular embodiment of the methods of the invention, the sintering peak temperature is 1500° C. and that temperature is maintained for about 2 hours.

It is preferred that the sintered blank be slowly heated to sintering temperature and slowly cooled so as to avoid undesirable dimensional changes and crack development. In an embodiment of the invention having a preferred sintering temperature of 1500° C., preferred temperature ramps during heating are: about 0.3° C./minute for room temperature to about 300° C., about 0.1° C./minute for about 300° C. to about 400° C., about 0.4° C./minute for about 400° C. to about 600° C., and about 1.5° C./minute for about 600° C. to about 1500° C. Preferred temperature ramps during cooling are: about 2° C./minute for about 1500° C. to about 800° C. and about 1.6° C./minute for about 800° C. to room temperature.

The exact manner in which the dopant is in contact with the blank during sintering is not critical, however, the "case", as that term is used herein, is limited to those areas of the blank in contact with the dopant during sintering. For example, a cubic spinel and zirconia alloy case can be readily produced by the methods of the invention on a portion of the overall surface of an article. It is not critical that the dopant be in contact with the blank during initial sintering, that is, sintering which does not result in an increase in density to full density.

The Comparative Examples illustrate some alternatives for providing contact between the blank and the dopant during sintering. In Comparative Example 3, the blank rested on a dopant plate during sintering. In Comparative Example 4, blanks resting on inert plates on which had been sprinkled dopant powder, produced similar results. In Comparative Example 2, in contrast, a blank resting on an inert plate retained a tetragonal zirconia alloy and alumina structure. U.S. patent application Ser. No. 07/816,646, discloses the provision of a dopant in the method disclosed therein, by metallo-organic decomposition (MOD). MOD and similar procedures are also applicable to the methods of the invention. In MOD, a metallo-organic precursor of a ceramic material is dissolved in a solvent and layered over a substrate which is then thermally decomposed at a temperature of about 500° to 600° C. to yield metal oxide. Dopant precursor coatings can be applied in MOD by spinning or by other means such as dipping. Other dopant precursors: metallo-organics and inorganic metal salts, which yield dopant upon decomposition at a temperature less than the sintering temperature of the zirconia alloy, can be applied in a manner comparable to MOD. MOD and other procedures in which dopant is applied through a liquid may provide better coverage of the blank with dopant than procedures, like those in Comparative Examples 3 and 4, in which the dopant is supplied as a solid. An advantage may also be presented by methods such as dipping in that complex three dimensional shapes can be readily coated.

The methods of the invention are applicable to the production of a variety of articles, particularly cutting tools and abrasion and wear resistant parts, in that many tools have a longer service life if the working surface is a hard cast overlying a tough core. Examples of tools include slitter knives, punches and dies; for cloth, cardboard, metal, polymeric materials and paper coated with abrasive material such as silver halides and the like. FIG. 4 illustrates a ceramic perforator 38 having cutting edge 40 mounted on mounting shank 42. Punch can be mounted by shank 42 on any typical punch assembly, such as a reciprocating punch or a rotary punch upon which can be mounted a plurality of punches 36. The case of perforator 38 can be limited to cutting edge 40 or can encompass the entire outside of perforator.

The configuration of articles prepared by the methods of the invention is limited by the requirements of cold compaction and sintering; for example, mold size and shape and sintering oven size and shape; but is not believed to be subject to other limitations. The methods and articles of the invention are not limited to discrete ceramic items, thus the terms blank and ceramic article and the like, used herein can also refer to portions of larger items.

The following Comparative Examples are presented for a further understanding of the invention:

COMPARATIVE EXAMPLE 1

Zirconia alloy having 3 mole percent $Y_2O_3$ was obtained as a prepared alloy powder from Z-TECH Corporation, Bow, N.H. The alloy powder had an agglomerate size range from 30 micrometers to 60 micrometers, an average agglomerate size of 50 micrometers, a grain size range from 0.1 micrometer to 0.6 micrometer, an average grain size of 0.3 micrometers, and a moisture content of 0.5 percent by volume. Polyvinyl alcohol in the amount of 4 percent by volume of the green part was added to the zirconia alloy powder as a binder.

Alumina having an agglomerate size range from 30 micrometers to 60 micrometers, an average agglomerate size of 50 micrometers, a grain size range from 0.1 micrometer to 0.6 micrometer, an average grain size of 0.3 micrometers, and a moisture content of 0.5 percent by volume was thoroughly mixed with the zirconia alloy-binder premix by ball milling. The resulting particulate mixture was compacted in the floating mold die press above described, at a compacting pressure of 15,000 psi (100 MPa) for 30 seconds and with a fill ratio of about 3.0, to compact the powder into a blank. Blanks were placed on tetragonal zirconia plates during sintering and were sintered by sequentially heating the green part from room temperature to 300° C. at a rate of 0.3° C./min., from 300° C. to 400° C. at a rate of 0.1° C./min., from 400° C. to 600° C. at a rate of 0.4° C./min., from 600° C. to 1500° C. at a rate of 1.5° C./min.; then maintaining the preform at 1500° C. for 120 minutes; and then sequentially cooling the part from 1500° C. to 800° C. at a rate of 2° C./minute, from 800° C. to room temperature at a rate of 1.6° C./minute. Dimensional shrinkage was uniform throughout the ceramic article to within 0.001 percent.

X-ray diffraction analysis was performed using an X-ray diffractometer manufactured by Rigaku Corp. Coupled angle diffraction was used to detect the phases present at the core. Glancing angle diffraction was used to detect phases present at the case. Tetragonal zirconia alloy and alumina were detected in both case and core.

Knoop indentation hardness was measured for indicated Comparative Examples and Examples as a function of load using a Tukon Microhardness Tester, Model # 300 FM/DF. All measurements were made on flat and smooth (RMS less than 40 microns) surfaces. Nominal indentation load was 500 gf and an average was taken of at least ten indentation readings. Hardness values measured by Knoop indentation for the articles of Comparative Example 1 were in the range 12–13 GPa.

The ranges of proportions of $ZrO_2$ to $Al_2O_3$ varied from 100% to 0% and 0% to 100%. Depending on the proportions, the amounts of tetragonal phase of $ZrO_2$ and $\alpha$-$Al_2O_3$ varied from "major" to "minor" to "none detected" and, "none detected" to "minor" to "major" respectively. Specific examples, in the case of 100% $ZrO_2$/0% $Al_2O_3$ the tetragonal phase is "major"; in the case of 0% $ZrO_2$/100%/ $Al_2O_3$ the $\alpha$-$Al_2O_3$ phase is "major".

The following Example is presented for a further understanding of the invention:

EXAMPLES 1–5

The procedures of Comparative Example 1 were followed with the exception that the alumina concentration in the blanks were varied as indicated in Table 1 and the blanks were sintered on MgO plates. X-ray diffraction analyses are reported in Tables 1–2.

In the Tables, the order of the amounts indicated are: major, moderate, minor, trace, possible, and none detected.

TABLE 1

CASES OF EXAMPLES AND COMPARATIVE EXAMPLE: X-RAY DIFFRACTION AT GLANCING ANGLES, Cu K$\alpha$

| Ex. or Comp. Ex. | Comp. Ex. 1 | Ex. 1 | Ex. 2 | Ex. 4 | Ex. 5 |
|---|---|---|---|---|---|
| $ZrO_2$/$Al_2O_3$ (wt/wt) | various proportions | 0/100 | 1/99 | 5/95 | 20/80 |
| Cubic $ZrO_2$ | none detected | none detected | minor | moderate | major |
| Monoclinic $ZrO_2$ | trace to none | none detected | none detected | trace | moderate |
| Tetragonal $ZrO_2$ | major to minor to none | none detected | none detected | none detected | possible |
| Cubic $MgAl_2O_4$ | none detected | major | major | major | major |
| $\alpha$-$Al_2O_3$ | none to minor to major | moderate | minor | minor | major |
| $\beta$-$Al_2O_3$ | none to trace | moderate | minor | minor | minor |
| MgO | none detected | trace | minor | minor | trace |

TABLE 2

CORES OF EXAMPLES: X-RAY DIFFRACTION AT θ/2θ, Cu K$\alpha$

| Ex. or Comp. Ex. | Ex. 1 | Ex. 2 | Ex. 4 | Ex. 5 |
|---|---|---|---|---|
| $ZrO_2$/$Al_2O_3$ (wt/wt) | 0/100 | 1/99 | 5/95 | 20/80 |
| Cubic $ZrO_2$ | none detected | none detected | none detected | none detected |
| Monoclinic $ZrO_2$ | none detected | trace | trace | moderate |
| Tetragonal $ZrO_2$ | none detected | minor | moderate | major |
| Cubic $MgAl_2O_4$ | none detected | none detected | none detected | none detected |
| $\alpha$-$Al_2O_3$ | major | major | major | major |
| $\beta$-$Al_2O_3$ | minor detected | none detected | none detected | none |
| MgO | none detected | none detected | none detected | none detected |

COMPARATIVE EXAMPLE 2

Zirconia alloy having 3 mole percent $Y_2O_3$ was obtained as a prepared alloy powder from Z-TECH Corporation, Bow, N.H. The alloy powder had an agglomerate size range from 30 micrometers to 60 micrometers, an average agglomerate size of 50 micrometers, a grain size range from 0.1 micrometer to 0.6 micrometer, an average grain size of 0.3 micrometers, and a moisture content of 0.5 percent by volume. Polyvinyl alcohol in the amount of 4 percent by volume of the green part was added to the zirconia alloy powder as a binder.

Alumina having an agglomerate size range from 30 micrometers to 60 micrometers, an average agglomerate size of 50 micrometers, a grain size range from 0.1 micrometer to 0.6 micrometer, an average grain size of 0.3 micrometers, and a moisture content of 0.5 percent by volume was thoroughly mixed with the zirconia alloy-binder premix by ball milling so as to yield an alumina concentration of 20 parts by weight of alumina to 80 parts by weight of zirconia alloy. The resulting particulate mixture was compacted in the floating mold die press above described, at a compacting pressure of 15,000 psi (100 MPa) for 30 seconds and with a fill ratio of about 3.0, to compact the powder into a blank. Blanks were placed on tetragonal zirconia plates during sintering and were sintered by sequentially heating the green part from room temperature to 300° C. at a rate of 0.3° C./min., from 300° C. to 400° C. at a rate of 0.1° C./min., from 400° C. to 600° C. at a rate of 0.4° C./min., from 600° C. to 1500° C. at a rate of 1.5° C./min.; then maintaining the preform at 1500° C. for 120 minutes; and then sequentially cooling the part from 1500° C. to 800° C. at a rate of 2° C./minute, from 800° C. to room temperature at a rate of 1.6° C./minute. Dimensional shrinkage was uniform throughout the ceramic article to within 0.001 percent.

X-ray diffraction analysis was performed using an X-ray diffractometer manufactured by Rigaku Corp. Coupled angle diffraction was used to detect the phases present at the core. Glancing angle diffraction was used to detect phases present at the case. Tetragonal zirconia alloy and alumina were detected in both case and core.

COMPARATIVE EXAMPLE 3

The procedures of Comparative Example 2 were followed with the exception that the blank was sintered on an MgO plate. X-ray diffraction analysis showed that the core was tetragonal zirconia alloy and alumina and the case was tetragonal zirconia alloy and cubic spinel.

COMPARATIVE EXAMPLE 4

The procedures of Comparative Example 2 were followed with the exception that the blank was sintered on an $Al_2O_3$ plate on which was sprinkled very fine (0.3 micrometer) MgO powder. X-ray diffraction analysis results were comparable to those in Comparative Example 3 and indicated that the core was tetragonal zirconia alloy and alumina and the case was tetragonal zirconia alloy and cubic spinel.

COMPARATIVE EXAMPLE 5

The procedures of Comparative Example 3 were followed with the exception that the blank had a aluminum oxide concentration of 10 parts by weight of alumina to 90 parts by weight of zirconia alloy. X-ray diffraction analysis results indicated that the core was tetragonal zirconia alloy and alumina and the case was tetragonal zirconia alloy and cubic spinel.

COMPARATIVE EXAMPLE 6

The procedures of Comparative Example 2 were followed with the exception that the blank had a aluminum oxide concentration of 5 parts by weight of alumina to 95 parts by weight of zirconia alloy. X-ray diffraction analysis results indicated that the core was tetragonal zirconia alloy and alumina and the case was tetragonal zirconia alloy and cubic spinel.

COMPARATIVE EXAMPLE 7

The procedures of Comparative Example 3 were followed with the exception that the blank had a aluminum oxide concentration of 2 parts by weight of alumina to 98 parts by weight of zirconia alloy. X-ray diffraction analysis results indicated that the core was tetragonal zirconia alloy and alumina and the case was cubic zirconia alloy and cubic spinel.

It is an advantageous feature of at least some embodiments of the invention that a method is provided for producing an article having a core that is predominantly alumina and a case that is predominantly cubic spinel.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto.

What is claimed is:

1. A method for preparing an alumina ceramic article comprising:

compacting a mixture of a first concentration of particulate aluminum oxide and a second concentration of particulate zirconium oxide alloy, said zirconium oxide alloy consisting essentially of zirconium oxide and a secondary oxide selected from the group consisting of MgO, CaO, $Y_2O_3$, $CeO_2$, $Sc_2O_3$ rare earth oxides, and combinations of these secondary oxides; wherein zirconium oxide alloy has a concentration of said secondary oxide of, in the case of $Y_2O_3$, about 0.5 to about 5 mole percent; in the case of MgO, about 0.1 to about 1.0 mole percent, in the case of $CeO_2$, about 0.5 to about 15 mole percent, in the case of $Sc_2O_3$, about 0.5 to about 7.0 mole percent and in the case of CaO from about 0.5 to about 5 mole percent, relative to the total of said zirconium oxide alloy, said compacting further comprising forming a blank;

providing contact between said blank and a material consisting essentially of a dopant oxide selected from the group consisting of MgO, ZnO, FeO, CoO, NiO, and MnO, said contact being subsequent to said forming of said blank; and sintering said blank in contact with said dopant oxide, said sintering further comprising diffusing said dopant oxide into the surface of said blank, converting said aluminum oxide particles in said surface into cubic spinel, and converting said zirconium oxide alloy particles in said surface from a tetragonal crystal structure to cubic and monoclinic crystal structures;

wherein said first concentration is less than 5 weight percent of the total of the first and second concentrations or is greater than 75 weight percent of the total of said first and second concentrations, and wherein said first concentration is sufficient to prevent retention of said zirconium oxide alloy particles in said surface in a predominantly tetragonal crystal structure;

whereby said prepared ceramic article has a core consisting essentially of sintered particles of (1) said zirconium oxide alloy in a tetragonal crystal structure and (2) aluminum oxide, and a continuous surface comprising sintered particles of (a) zirconium oxide alloy in non-tetragonal crystal structures and (b) cubic spinel;

wherein said sintering and compacting are maintained for from about 1 to about 3 hours, at a pressure from about 69 MPa to about 207 MPa and at a temperature from about 1400° C. to about 1600° C.; and wherein said reducing is to a density of from about 99.5 to about 99.9 percent of theoretical density; and further comprising the steps of gradually heating and gradually cooling said article.

2. The method of claim 1 wherein said first concentration is sufficient to convert said zirconium oxide alloy particles in said surface from tetragonal crystal structure to predominantly cubic and monoclinic crystal structures;

whereby said prepared ceramic article has a core consisting essentially of sintered particles of (1) said zirconium oxide alloy in a tetragonal crystal structure and (2) aluminum oxide, and a surface comprising sintered particles of (a) zirconium oxide alloy in cubic and monoclinic crystal structures and (b) cubic spinel.

3. The method of claim 1 wherein said first concentration is from about 75 to 99 weight percent.

4. The method of claim 1 wherein said first concentration is from about 80 to about 99 weight percent.

5. The method of claim 1 wherein said sintering is at a temperature from about 1400° C. to about 1600° C.

6. The method of claim 1 wherein said sintering is at a temperature of about 1500° C.

7. The method of claim 1 wherein said secondary oxide comprises $Y_2O_3$.

8. The method of claim 1 wherein the particulate zirconium oxide alloy has a concentration of secondary oxide selected from the group consisting of MgO, CaO, $Y_2O_3$, $Sc_2O_3$, and $CeO_2$ of from about 0.1 to about 1.0 mole percent, from about 0.5 to about 5 mole percent, from about 0.5 to about 5 mole percent, from about 0.5 to about 7.0 mole percent, and from about 0.5 to about 15 mole percent, respectively, relative to the total of said zirconium alloy oxides.

9. An alumina ceramic article comprising a core and a case, said core consisting essentially of sintered particulate zirconium oxide alloy and particulate aluminum oxide, said particulate zirconium oxide alloy having a composition consisting essentially of Zr, O and a secondary oxide of at least one element selected from the group consisting of Mg, Ca, Y, Sc, Ce and rare earth elements, said particulate zirconium oxide alloy having a substantially tetragonal structure;

said case being a continuous layer and said case being exterior to and continuous with said core, said case including sintered particulate cubic or monoclinic structure zirconium oxide alloy or both and particulate cubic spinel, said zirconium oxide alloy having an elemental composition including Zr, O and at least one element selected from the group consisting of Mg, Ca, Y, Ce, Sc and rare earth elements, said cubic spinel having an elemental composition including Al, O, and at least one element selected from the group consisting of Mg, Fe, Co, Ni, Mn, and Zn.

10. The alumina ceramic article of claim 9 wherein said particulate zirconium oxide alloy has a concentration of said secondary oxide of about 0.5 to about 5 mole percent $Y_2O_3$, from about 0.1 to about 1 mole percent MgO, from about 0.5 to 15 mole percent $CeO_2$, from about 0.5 to about 7.0 mole percent $Sc_2O_3$ or from about 0.5 to about 5 mole percent CaO relative to the total of said zirconium oxide alloy.

11. The alumina ceramic article of claim 9 wherein said particulate zirconium oxide alloy has a concentration of $Y_2O_3$ of about 3 mole percent relative to the total of said particulate zirconium oxide alloy.

12. The alumina ceramic article of claim 11 wherein the concentration of said particulate aluminum oxide is from about 80 to about 99 weight percent.

13. The alumina ceramic article of claim 9 wherein the concentration of said particulate aluminum oxide is from about 80 to about 99 weight percent.

14. A method of preparing an alumina ceramic article having a density greater than 99 percent of theoretical density, comprising the steps of:

compacting a mixture of particulate aluminum oxide and particulate zirconium oxide alloy, said mixture having a concentration of particulate aluminum oxide of from about 80 to 99 weight percent relative to the total of said particulate aluminum oxide and said particulate zirconium oxide alloy concentrations, said zirconium oxide alloy consisting essentially of zirconium oxide and a secondary oxide selected from the group consisting of MgO, CaO, $Y_2O_3$, $CeO_2$, $Sc_2O_3$, and rare earth oxides, said zirconium oxide alloy has a concentration of said secondary oxide of about 0.5 to about 5 mole percent $Y_2O_3$, from about 0.1 to about 1 mole percent MgO, from about 0.5 to 15 mole percent $CeO_2$, from about 0.5 to about 7.0 mole percent $Sc_2O_3$ or from about 0.5 to about 5 mole percent CaO relative to the total of said zirconium oxide alloy, to form a blank;

reducing the porosity of said blank;

sintering said blank; and during said sintering, diffusing a dopant oxide selected from the group consisting of MgO, FeO, ZnO, CoO, NiO and MnO, into the surface of said blank, said dopant oxide converting aluminum oxide particles in said surface in cubic spinel particles and converting tetragonal zirconium oxide particles in said surface into cubic or monoclinic crystal structures or both;

whereby said prepared ceramic article has a core consisting essentially of sintered particles of (1) said zirconium oxide alloy in a tetragonal crystal structure and (2) aluminum oxide, and a continuous surface comprising sintered particles of a zirconium oxide alloy in non-tetragonal crystal structures and cubic spinel;

wherein said sintering and compacting are maintained at a pressure from about 69 MPa to about 207 MPa.

15. The method of claim 14 wherein said sintering is in an oxidizing atmosphere.

16. The method of claim 14 wherein said compacting is at a pressure from about 100–103 MPa;

said gradually heating is at a temperature ramped at about 0.3° C./minute for room temperature to about 300° C., then at about 0.1° C./minute for about 300° C. to about 400° C., then at about 0.4° C./minute for about 400° C. to about 600° C., then at about 1.5° C./minute for about 600° C. to about 1500° C.;

said sintering is for about 2 hours at a temperature of about 1500° C.; and said gradually cooling is at a temperature ramped at about 2° C./minute for about 1500° C. to about 800° C., and at about 1.6° C./minute for about 800° C. to room temperature.

17. An alumina ceramic article comprising a core and a case, said case being a continuous layer and said case being exterior to and continuous with said core, said core consisting essentially of sintered particulate alumina and particulate tetragonal structure zirconia alloy, said zirconia alloy consisting essentially of zirconia and a secondary oxide selected from the group consisting of MgO, CaO, $Y_2O_3$, $CeO_2$, $Sc_2O_3$, and rare earth oxides, said case including sintered particulate cubic spinel and particulate zirconia alloy, said particulate zirconia alloy consisting essentially of particles having crystal structures selected from the group consisting of cubic, monoclinic, and combinations of cubic and monoclinic.

18. The article of claim 17 wherein said particulate zirconium oxide alloy has an elemental composition consisting essentially of Zr, O and at least one element selected from the group consisting of Mg, Ca, Y, Ce, Sc and rare earth elements; said cubic spinel has an elemental composition including Al, O, and at least one element selected from the group consisting of Mg, Fe, Co, Ni, Mn, and Zn; and said alumina has an elemental composition consisting essentially of Al and O.

* * * * *